Patented Feb. 26, 1924.

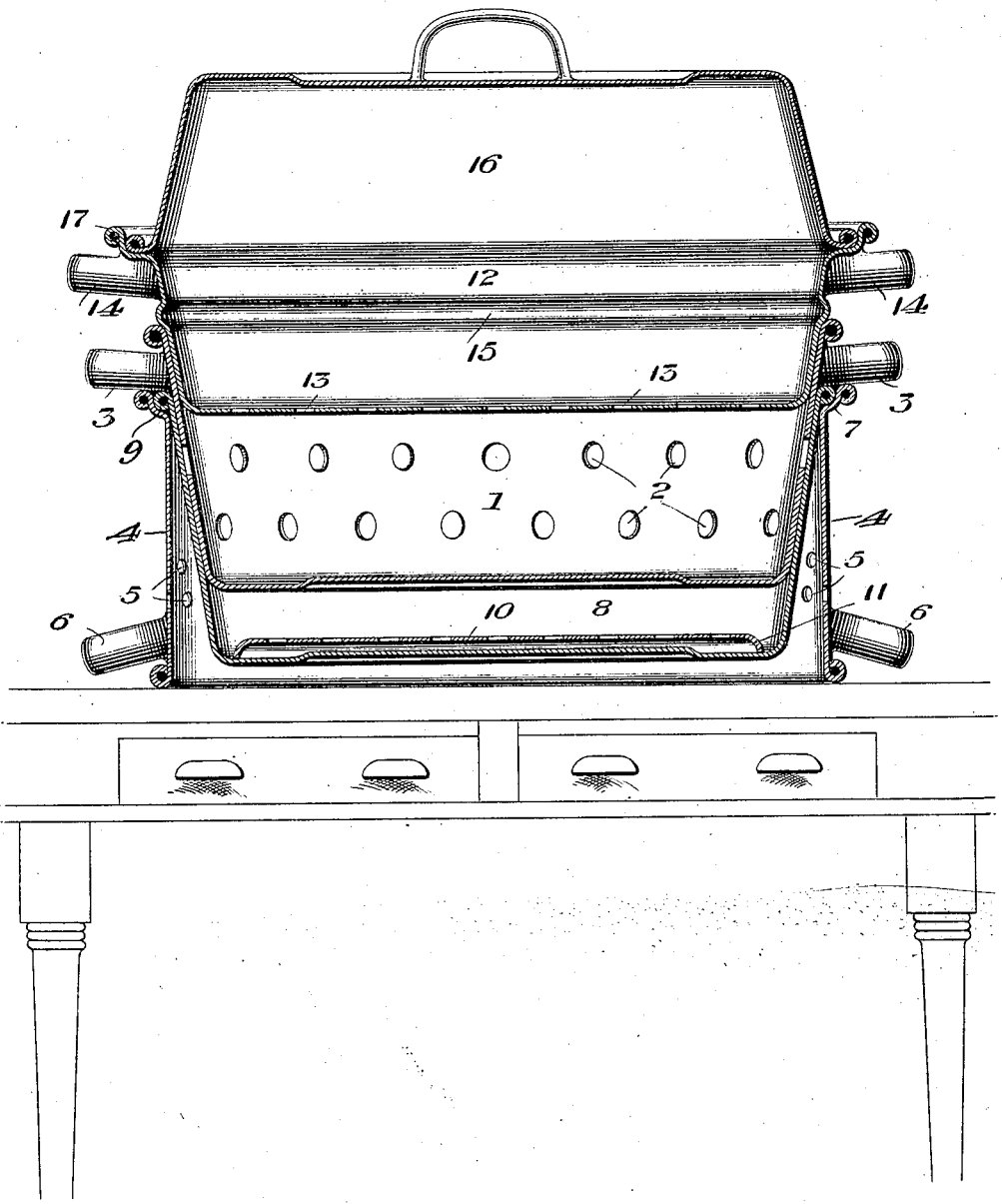

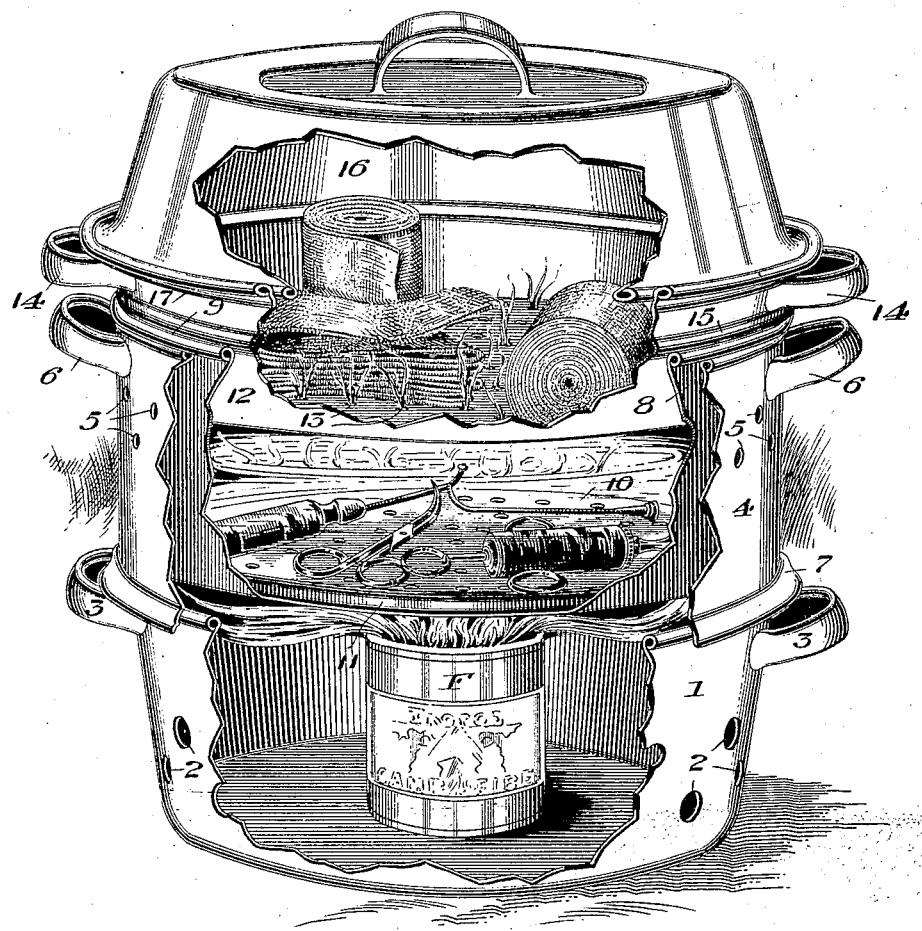

1,485,292

UNITED STATES PATENT OFFICE.

ISAAC C. POPPER, OF NEW YORK, N. Y., ASSIGNOR TO THE THEROZ COMPANY, OF NEW YORK, N. Y., A CORPORATION OF DELAWARE.

STERILIZER.

Application filed December 14, 1918. Serial No. 266,666.

*To all whom it may concern:*

Be it known that I, ISAAC C. POPPER, a citizen of the United States, residing at New York city, in the county of New York and State of New York, have invented certain new and useful Improvements in Sterilizers, of which the following is a specification.

My invention relates to an improvement in sterilizers, the object being to provide a portable sterilizer which is capable of being nested and reduced to comparatively small compass, and it consists in several parts that can be supported, one above the other, so that several compartments are provided, as, for instance, one for instruments and another for gauze and bandages, or anything else in fact to be sterilized, such as bottles or other receptacles, or articles used for food, or in eating.

In the accompanying drawings:—

Fig. 1 is a vertical sectional view through the sterilizer, showing the parts nested;

Fig. 2 is a perspective view partly broken away, showing the several parts in operation.

The numeral 1 represents the lower receptacle, which I shall term the base. This is made in the general form of a pan, with the perforations 2 in the sides, and handles 3 at opposite points for convenience in handling.

In the center of this pan, a can F of fuel is placed, the holes being provided for air to support combustion.

The numeral 4 indicates a reversible rim. This is in the form of a cylinder without top or bottom, but having perforations 5 in the sides for the escape of the products of combustion, and having handles 6 at opposite points for convenience in handling. One edge is provided with a rounded, over-hanging, recessed flange 7 adapted when the sterilizer is in use to fit, embrace and rest upon the upper edge of the base 1. This rim is inverted when the parts are nested into small compass, and the base fits inside of it.

The numeral 8 indicates a pan of ordinary construction and having a flanged beaded upper edge 9, and it is of a size to fit into the rim with the beaded flange resting upon the upper edge of the latter, as shown in Fig. 1. A perforated disk 10 having a down-turned flange 11 fits loosely and is adapted to rest in the bottom of this pan in order to hold the instruments, or other articles being sterilized, away from the bottom. This disk is in the nature of a removable false bottom and may be used or not as required, but its purpose is to prevent the contents of the pan being sterilized from coming into immediate contact with the bottom of the pan which is immediately above the flame from beneath.

The gauze and bandage sterilizer 12 has perforations 13 in the bottom, handles 14 at opposite points, and on the exterior is provided with a circumferential bead 15 which rests upon the upper edge of the sterilizing pan 8. The purpose of this is to receive the steam generated from below for sterilizing the gauze, bandages, bottles, or other articles placed in the top.

A cover 16 is adapted to fit into the recessed flanged upper edge 17 of the gauze and bandage sterilizer to close the latter, practically steam-tight.

In nesting the various parts of the sterilizer, the rim 4 is inverted and the instrument pan is placed therein. Then the base pan is inserted, and finally the gauze and bandage sterilizer is placed in that and the cover is placed over the top, and by this nesting the height of the sterilizer is reduced from approximately thirteen inches, its normal height, to nine, in other words making a difference of four inches, so that the entire article can be packed and easily carried from place to place.

I claim:

An article of the character described including a lower receptacle, a reversible rim, said parts being perforated, a pan, a perforated disk removably placed therein and provided with a downturned flange whereby the disk is supported in the pan, a gauze and bandage sterilizer having perforations in the bottom thereof, and a cover for the sterilizer, all of said parts being nestable and all but the disk having beaded rims at the outer edges.

In testimony whereof I affix my signature.

ISAAC C. POPPER.